W. TURNBULL.
WINDLASS ATTACHMENT FOR TRACTORS.
APPLICATION FILED APR. 27, 1917.
1,417,784.
Patented May 30, 1922.
4 SHEETS—SHEET 1.
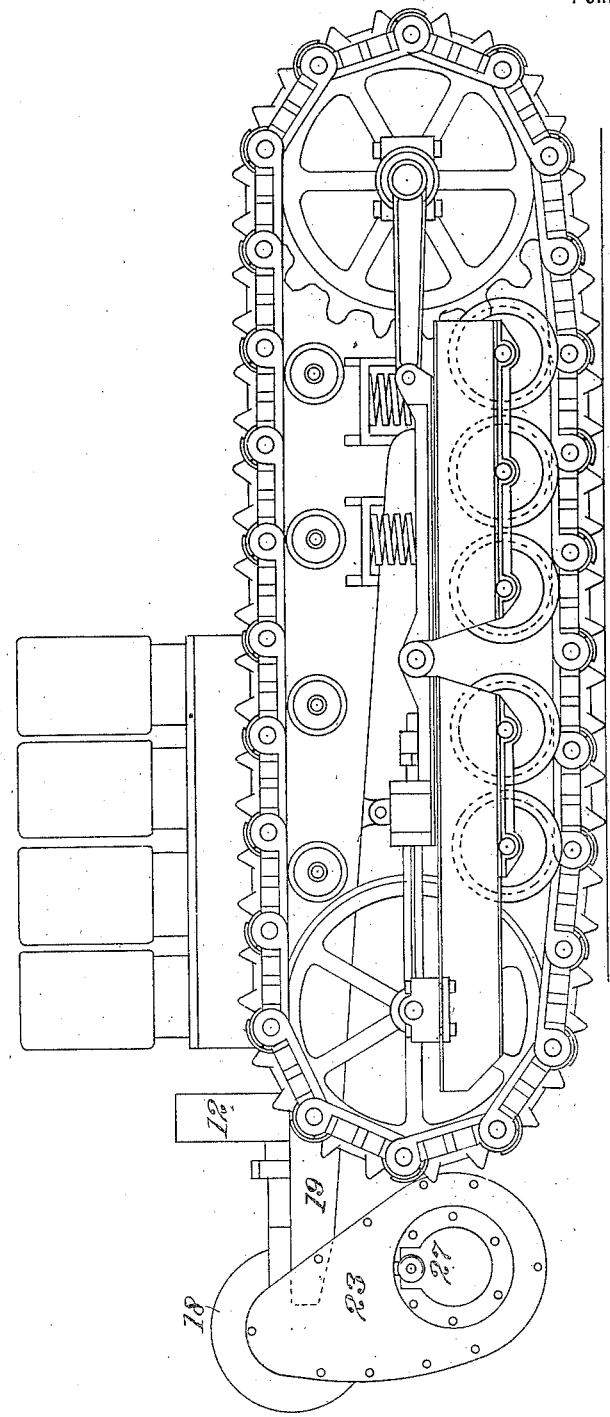
WITNESSES:
Charles Rekeles
Julius C. Benesch
INVENTOR
William Turnbull
BY Strong & Townsend
ATTORNEYS

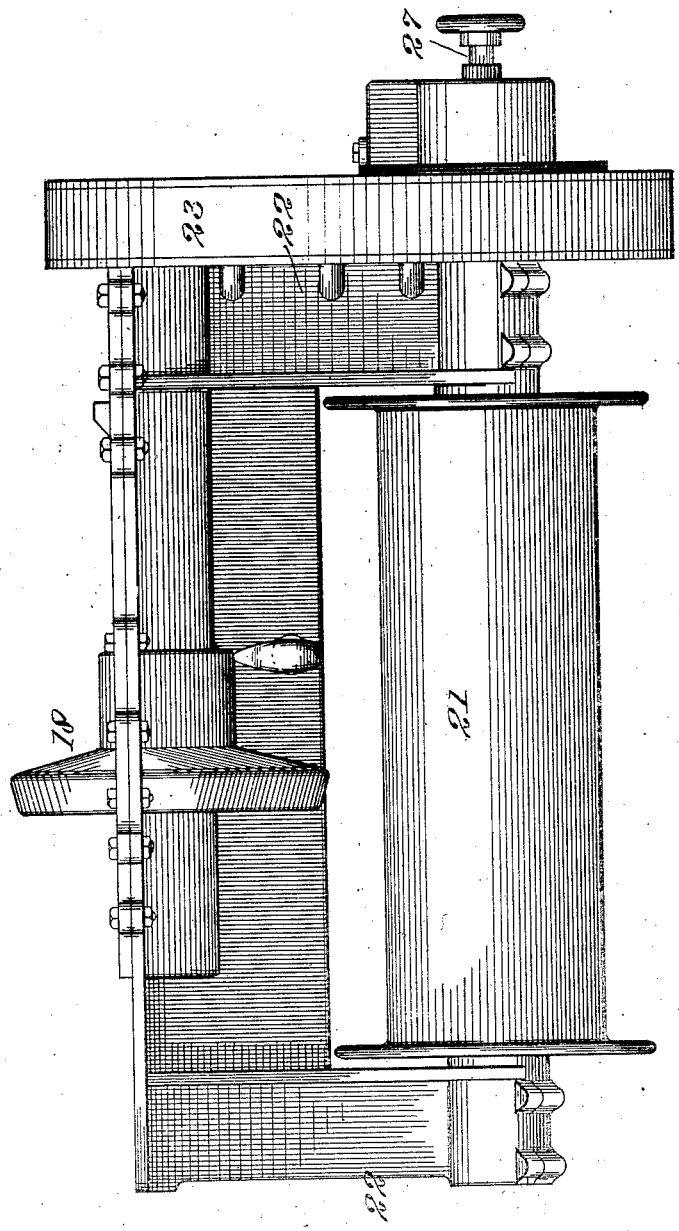

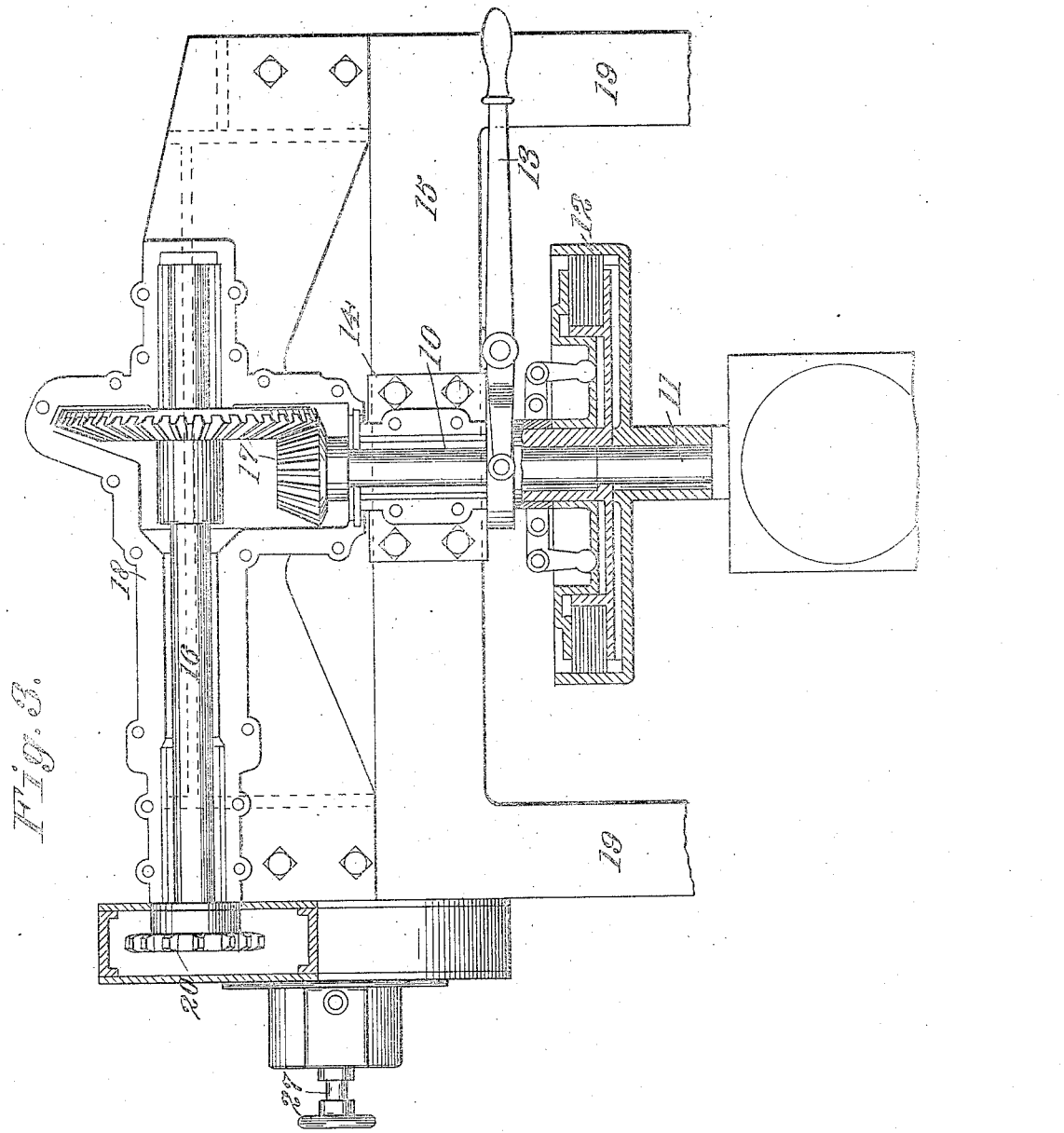

W. TURNBULL.
WINDLASS ATTACHMENT FOR TRACTORS.
APPLICATION FILED APR. 27, 1917.
1,417,784.
Patented May 30, 1922.
4 SHEETS—SHEET 4.
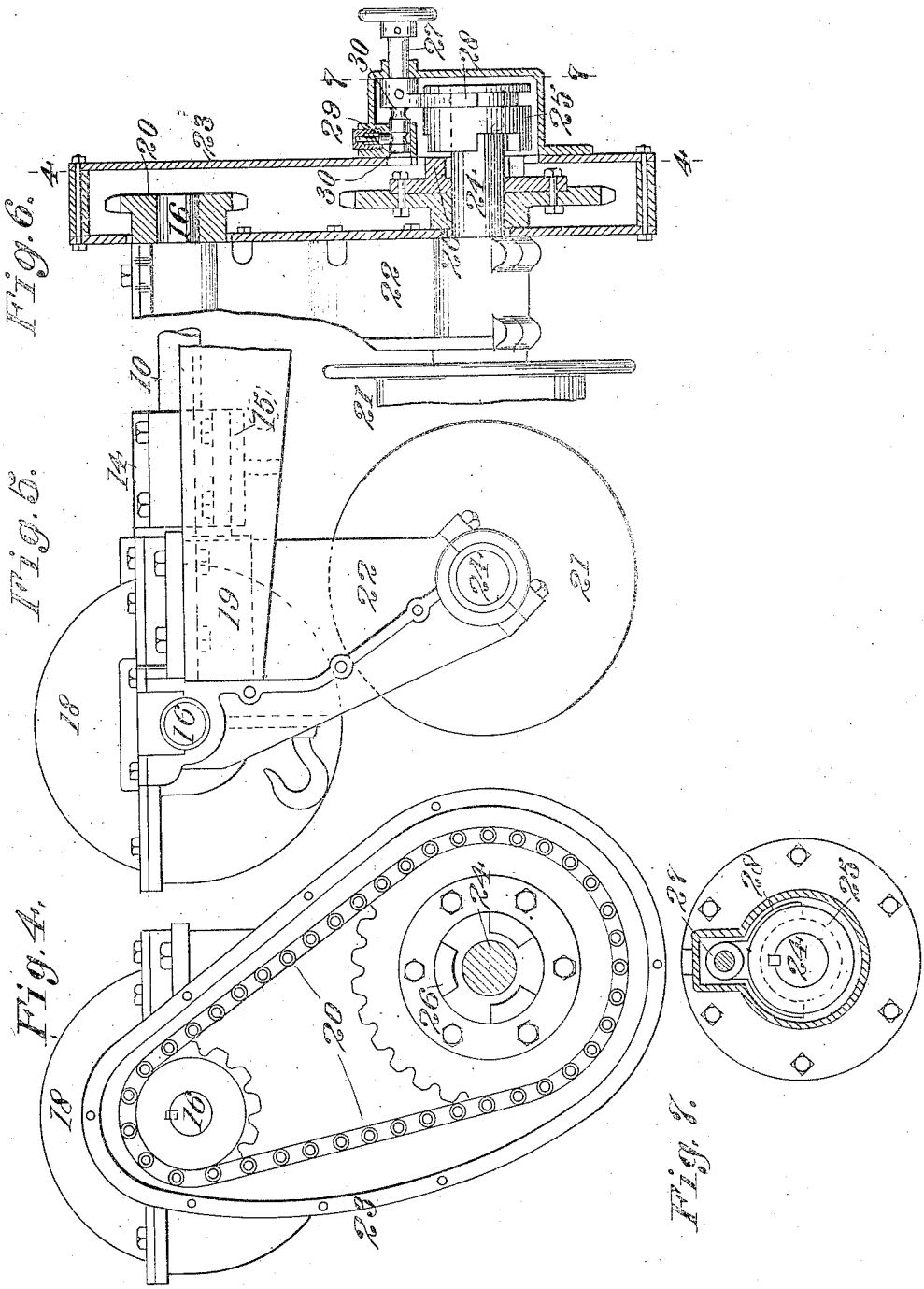
WITNESSES:
INVENTOR
William Turnbull
BY Strong & Townsend
ATTORNEYS

UNITED STATES PATENT OFFICE.

WILLIAM TURNBULL, OF PEORIA, ILLINOIS, ASSIGNOR TO THE HOLT MANUFACTURING COMPANY, OF STOCKTON, CALIFORNIA, A CORPORATION OF CALIFORNIA.

WINDLASS ATTACHMENT FOR TRACTORS.

1,417,784.   Specification of Letters Patent.   Patented May 30, 1922.

Application filed April 27, 1917. Serial No. 164,944.

*To all whom it may concern:*

Be it known that I, WILLIAM TURNBULL, a citizen of the United States, residing at Peoria, in the county of Peoria and State of Illinois, have invented new and useful Improvements in Windlass Attachments for Tractors, of which the following is a specification.

This invention relates to windlass attachments for tractors and the like for such purposes as grubbing and hauling, and also for pulling the tractor itself out of difficulties.

The object is to simplify and improve the construction and arrangement of such an attachment.

Briefly, the form of the invention herein shown and described comprises a transverse shaft journalled in bearings on the front end of the tractor, a longitudinally extending shaft between said transverse shaft and the motor crank-shaft, replacing the usual starting crank, a controllable friction clutch connecting the longitudinal shaft with the crank-shaft, a windlass secured to the tractor at the front thereof, below the main frame, and operatively connected to the transverse shaft by means of a chain drive, and a controllable clutch mechanism.

In the accompanying drawings—

Fig. 1 shows a side elevation of a tractor provided with an attachment embodying my invention.

Fig. 2 shows a front elevation of the attachment.

Fig. 3 shows a plan view, partly in section, of the same applied to the front end of a tractor frame.

Fig. 4 shows a side elevation of the attachment, with the cover of the chain drive casing removed.

Fig. 5 shows a side elevation of the attachment in place on a tractor.

Fig. 6 shows a fragmentary view of the attachment, with the chain drive casing in section.

Fig. 7 shows a detail, sectional view, taken on the line 7—7 of Fig. 6.

In the drawings a tractor is shown with a longitudinally extending shaft 10 connected to the front end of a crank-shaft 11 of the motor by means of a multiple disk clutch 12, controlled by a hand lever 13. The shaft 10 may replace the usual starting crank and is journalled in bearings 14 on the front cross-bar 15 of the main frame of the tractor. This shaft, at its forward end, connects with a transverse shaft 16 by suitable bevel gearing 17, said shaft 16 being journalled in a casing 18 detachably secured to the projecting front ends of the side bars 19 of the main frame.

At one end of the shaft 16 is a sprocket chain drive 20, running to a windlass 21 journalled below the main frame on brackets 22 made integral with the casing 18 and also detachably secured to the projecting front ends of the side bars of the main frame. A casing 23, preferably, encloses the chain drive and the arbor 24 of the windlass carries at its end, adjacent to the chain drive, a driven clutch member 25 keyed thereon and adapted to cooperate with a clutch member 26 on the sprocket wheel of the chain drive. A hand-operated rod 27 is reciprocally mounted in the casing 23 and carries a fork 28 for shifting the clutch member 25. A spring-pressed dog 29 cooperates with grooves 30 in the rod 27 to yieldingly retain the clutch member in and out of operative position.

Normally the clutch 25 is out of driving engagement while the friction clutch mechanism 12 remains in driving engagement. When it is desired to use the windlass for any purpose, such as grubbing stumps, hauling, etc., or for pulling the machine itself out of difficulties the clutch member 25 is thrown into engagement with its cooperating member and upon the starting of the motor the windlass will be operated to wind its cable. The starting of the windlass, on account of the friction clutch mechanism 12, will be gradual and slow and by manipulating the hand lever 13 the speed at which the windlass is operated can be varied by varying the pressure between the friction mmbers of the clutch.

The attachment of the windlass to a tractor or similar vehicle is simple and convenient and can be done without altering the usual construction. The location of the windlass at the front of the main frame and below the same is such as to relieve excessive strains from the frame and preserve the full tractive efficiency of the tractor.

Various changes in the construction and arrangement of the several parts herein shown and described may be employed without departing from the spirit of my invention as disclosed in the appended claim.

Having thus described my invention, what I claim and desire to secure by Letters Patent is—

In a tractor, a windlass detachably connected to the front end of the main frame below the same, driving connections for said windlass extending to the motor and including a transverse shaft journaled on the front end of the main frame, a casing for said transverse shaft, and downwardly extending brackets for the windlass, said casing and brackets being integrally formed.

In testimony whereof I have hereunto set my hand in the presence of two subscribing witnesses.

WILLIAM TURNBULL.

Witnesses:
EMIL F. WORELINO,
ROBERT W. GOTSHALL.